(12) United States Patent
Choi et al.

(10) Patent No.: US 7,133,102 B2
(45) Date of Patent: Nov. 7, 2006

(54) LIQUID CRYSTAL DISPLAY DEVICE AND FABRICATING METHOD THEREOF COMPRISING MONITORING AN ETCH RATE BY MEASURING A THICKNESS OR RESISTANCE OF ONE OF THE METAL SAMPLES FORMED IN A DUMMY AREA

(75) Inventors: Seung Kyu Choi, Taegu-kwangyokshi (KR); Du Hyun Na, Incheon-kwangyokshi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 83 days.

(21) Appl. No.: 10/301,292

(22) Filed: Nov. 21, 2002

(65) Prior Publication Data

US 2003/0123007 A1 Jul. 3, 2003

(30) Foreign Application Priority Data

Dec. 29, 2001 (KR) .......................... 10-2001-88453

(51) Int. Cl.
*G02F 1/136* (2006.01)

(52) U.S. Cl. .................. 349/139; 349/152; 349/187

(58) Field of Classification Search .................. 349/43, 349/152, 147–149, 182, 187, 54, 139, 192
See application file for complete search history.

(56) References Cited

U.S. PATENT DOCUMENTS

| | | | | | |
|---|---|---|---|---|---|
| 5,738,948 | A | * | 4/1998 | Ikeda et al. ................. | 428/663 |
| 5,835,177 | A | * | 11/1998 | Dohjo et al. ................ | 349/147 |
| 5,870,163 | A | * | 2/1999 | Watanabe et al. ........... | 349/149 |
| 6,195,149 | B1 | * | 2/2001 | Kodera et al. .............. | 349/187 |
| 6,198,522 | B1 | * | 3/2001 | Yanagi ....................... | 349/152 |
| 6,211,534 | B1 | * | 4/2001 | Matsumoto ................. | 257/59 |
| 6,310,667 | B1 | * | 10/2001 | Nakayoshi et al. ........... | 349/42 |
| 6,373,546 | B1 | * | 4/2002 | Kim ........................... | 349/152 |
| 6,392,721 | B1 | * | 5/2002 | Ochiai et al. ................. | 349/42 |
| 6,515,726 | B1 | * | 2/2003 | Chae et al. .................. | 349/139 |
| 6,587,176 | B1 | * | 7/2003 | Kim ........................... | 349/149 |
| 2001/0022639 | A1 | * | 9/2001 | Kwak et al. | |

FOREIGN PATENT DOCUMENTS

| | | |
|---|---|---|
| JP | 11-84387 | 3/1999 |
| KR | 2001-17525 | 3/2001 |

OTHER PUBLICATIONS

Copy of Korean Office Action regarding Korean Patent Application No. 2001-88453, (Jun. 18, 2004) (1 page).

* cited by examiner

*Primary Examiner*—Dung T. Nguyen
*Assistant Examiner*—Thoi V. Duong
(74) *Attorney, Agent, or Firm*—Brinks Hofer Gilson & Lione

(57) ABSTRACT

A liquid crystal display device and a fabricating method thereof enabling an optimized process by forming metal samples having various line widths on a circumference of a cell. The metal samples enable the measurement of a specific resistance of a data line formed by an ashing process. The specific resistance measurements are useful for designing the device. The invention includes a substrate divided into active and dummy areas, in which gate lines and data lines formed in the active area in directions perpendicular to each other. A plurality of metal samples are formed in the dummy area in which the metal samples have differing line widths in order to monitor the etch rate when forming the data line and the source/drain electrodes of the display device.

20 Claims, 22 Drawing Sheets

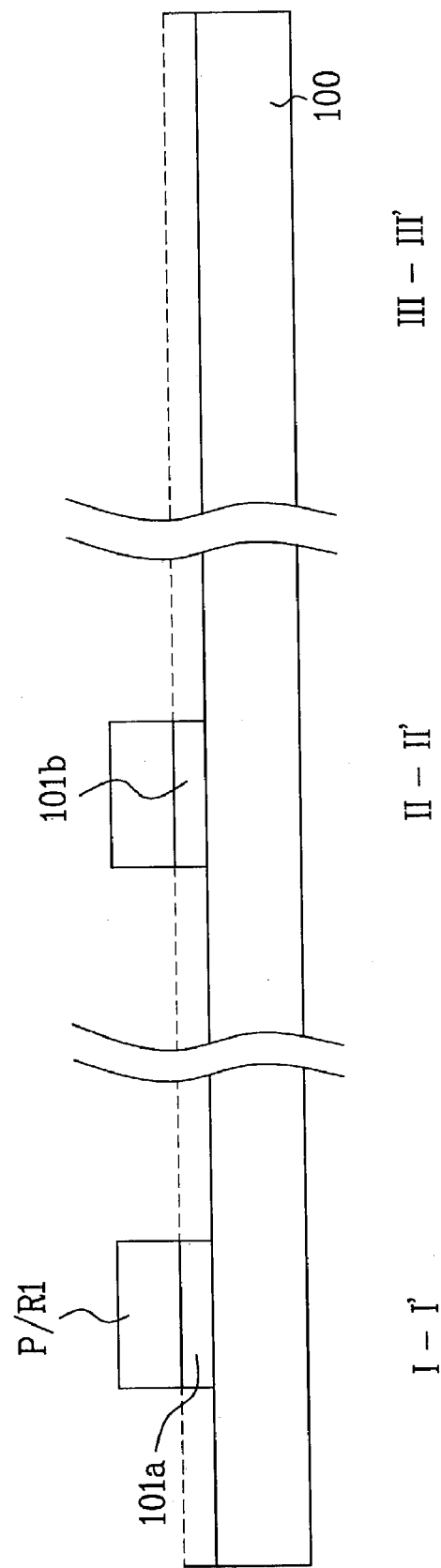

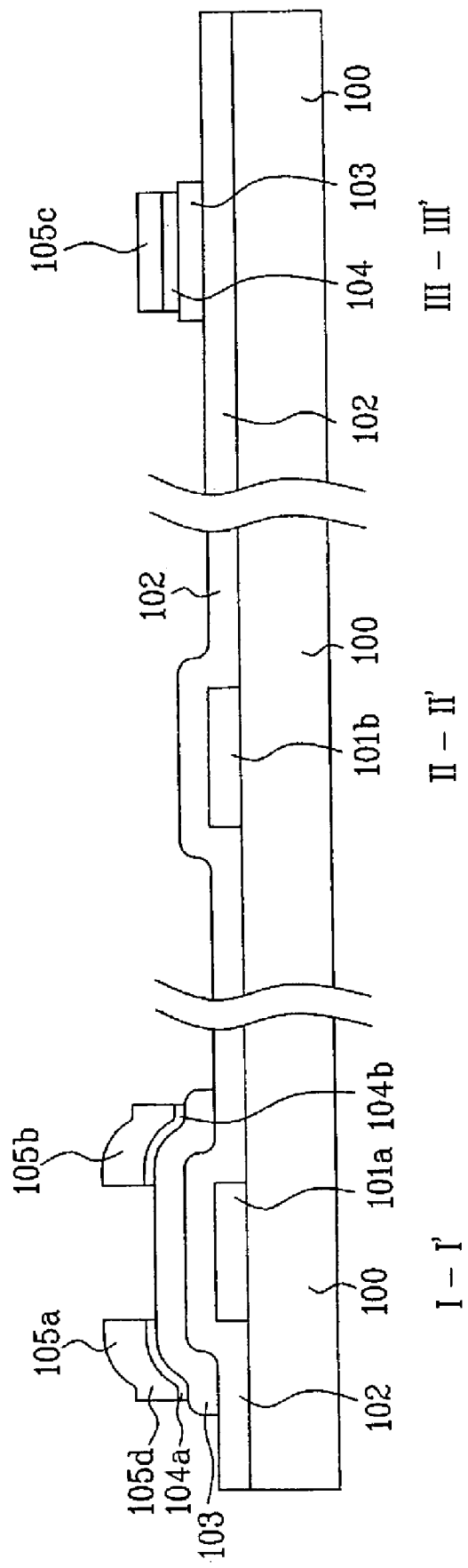

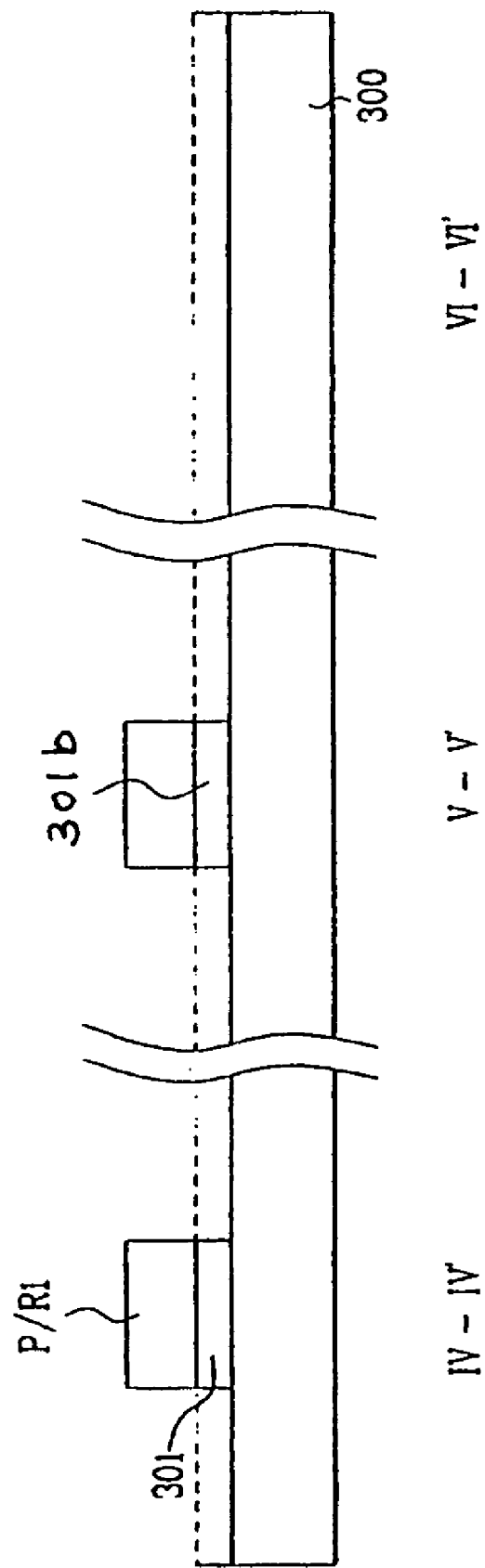

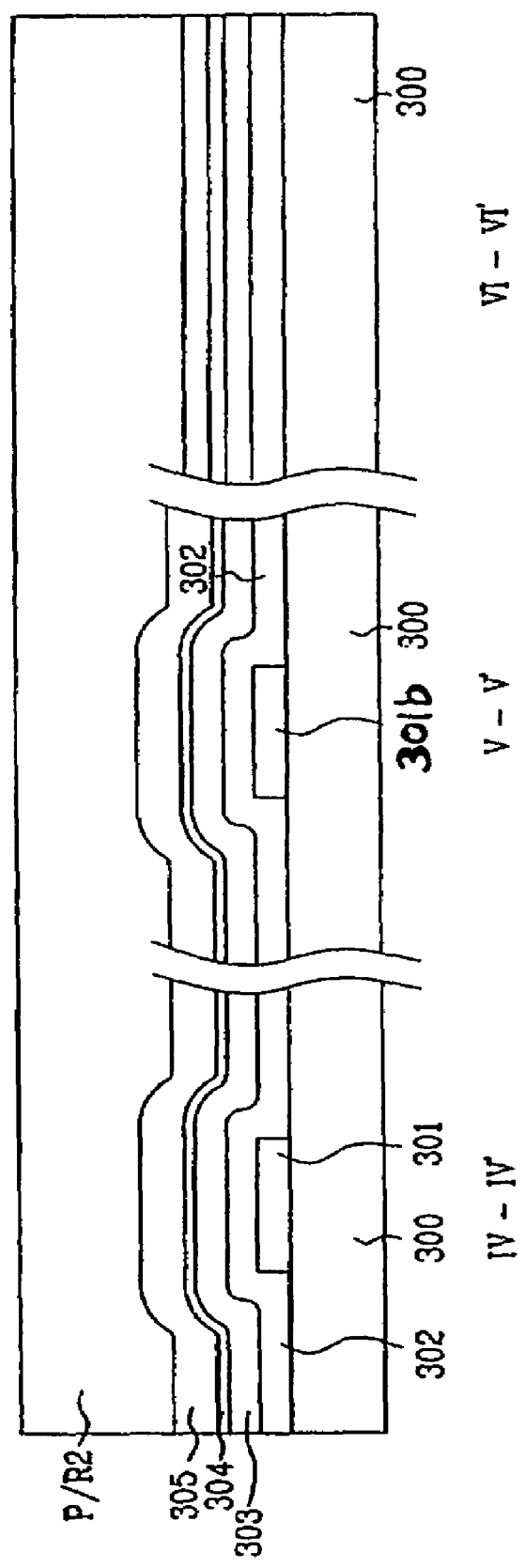

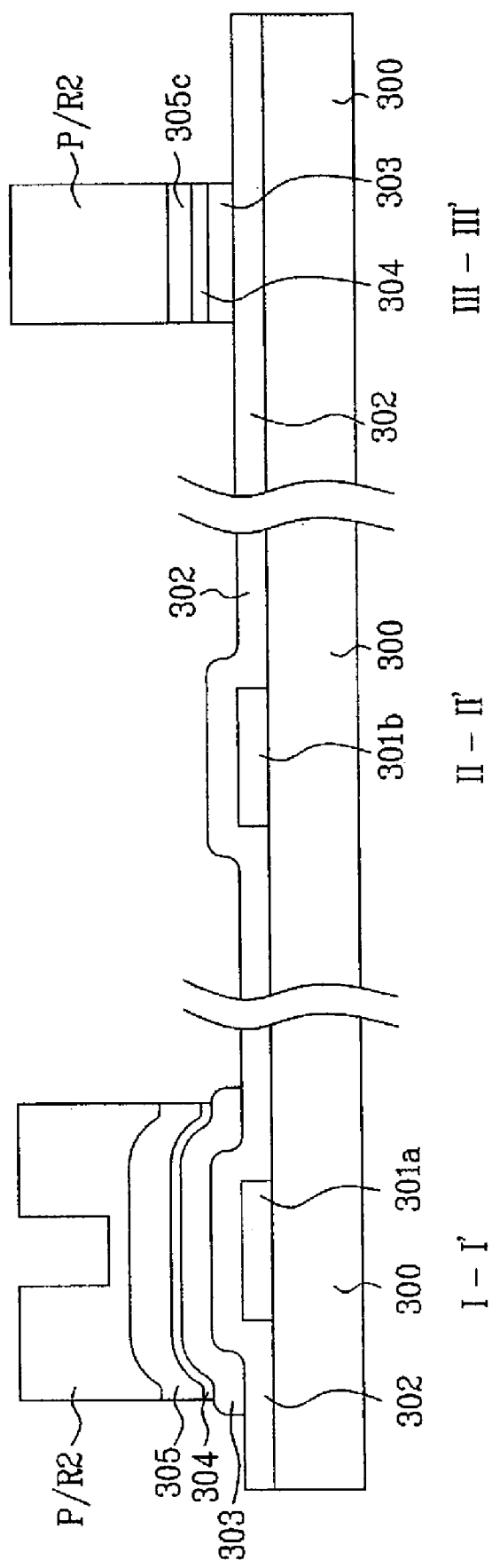

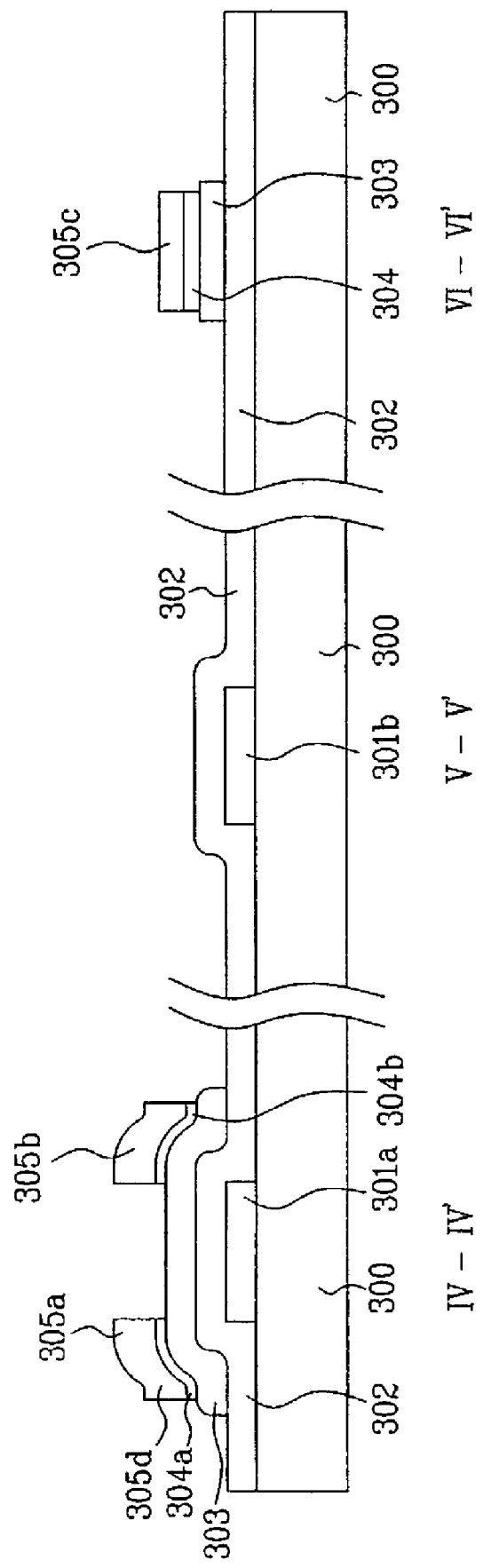

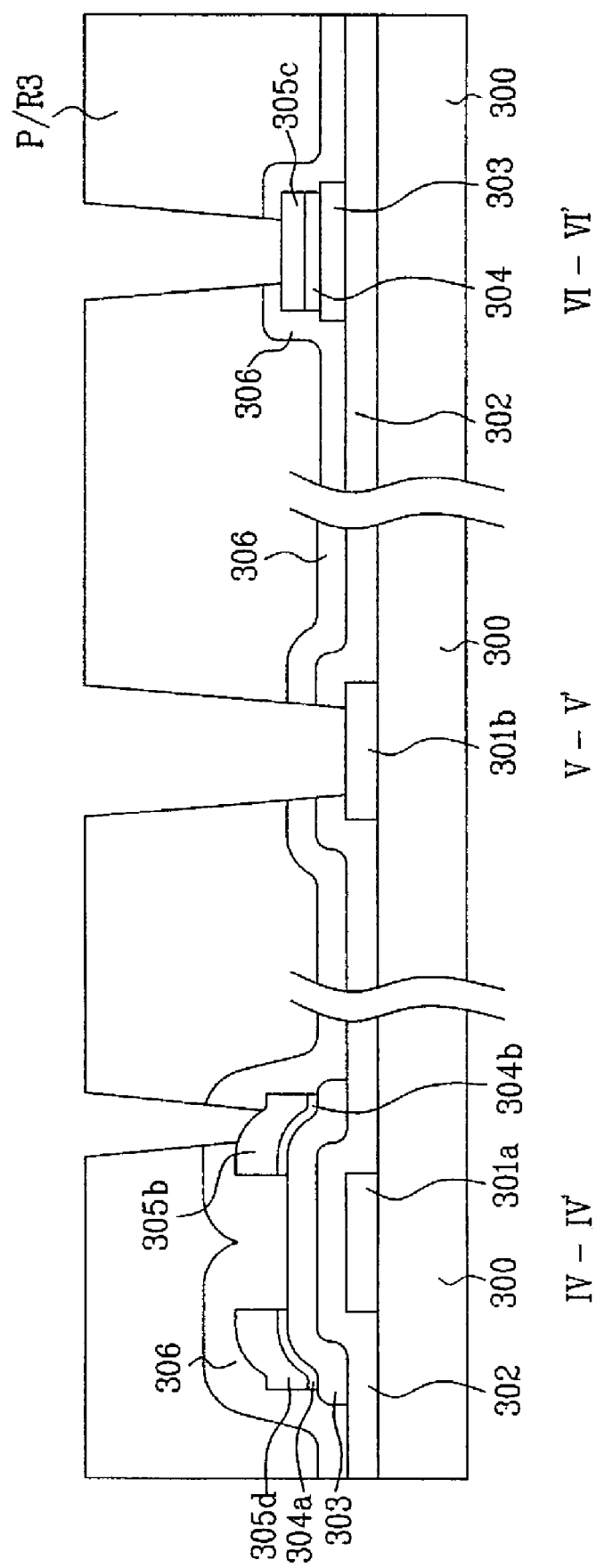

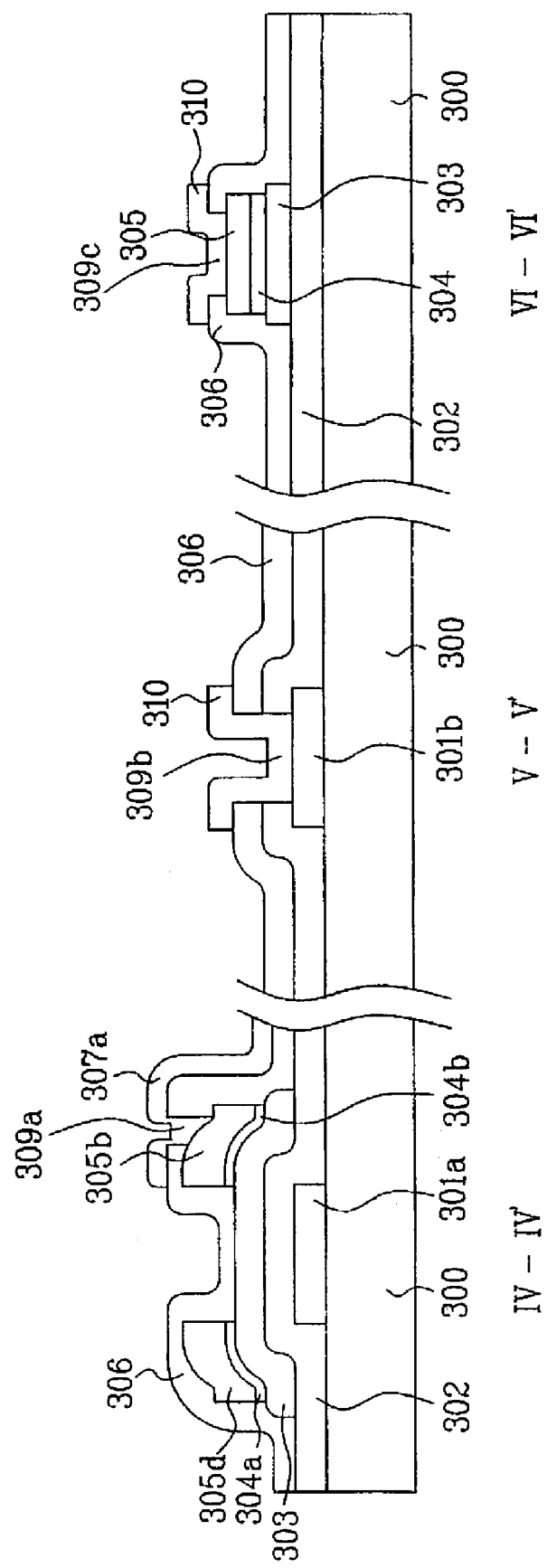

LIQUID CRYSTAL DISPLAY DEVICE AND FABRICATING METHOD THEREOF COMPRISING MONITORING AN ETCH RATE BY MEASURING A THICKNESS OR RESISTANCE OF ONE OF THE METAL SAMPLES FORMED IN A DUMMY AREA

RELATED DATA

This application claims benefit under 35 U.S.C. § 119 of Korean Application No. P2001-88453 filed on Dec. 29, 2001, which is hereby incorporated by reference herein.

BACKGROUND OF THE INVENTION

1. Field of the Invention

The present invention relates to a liquid crystal display device and a fabricating method thereof enabling to monitor an ashing rate just to carry out the process of forming a data line and source/drain electrodes uniformly using Mo.

2. Discussion of the Prior Art

Generally, a liquid crystal display has characteristics of low-voltage driving, low power consumption, full-color realization, lightness and compact size, and the like. These characteristics enable the widespread use of liquid crystal displays in devices such as televisions, airplane monitors, PDAs, mobile phones, and the like as well as calculators, watches, notebook computers, and personal computers.

Liquid crystal displays mainly include a liquid crystal panel displaying an image and a driving unit for applying a driving signal to the liquid crystal panel. Liquid crystal panels also include first and second glass substrates bonded to each other with a space therebetween and a liquid crystal layer injected in the space between the first and second glass substrates.

On the first glass substrate (TFT array substrate), a plurality of gate lines are arranged in one direction at a predetermined distance from each other. A plurality of data lines are arranged in a direction perpendicular to the gate lines at a predetermined distance from each other. A plurality of pixel electrodes are formed in a matrix pattern in pixel areas defined at locations where the gate and data lines cross each other. A plurality of thin film transistors are switched by signals from the gate lines and transfer signals from the data lines to the pixel electrodes.

The second glass substrate (color filter substrate) supports a black matrix layer for cutting off light to areas other than the pixel areas, an R/G/B color filter layer for representing colors, and a common electrode for realizing an image.

The first and second substrates are bonded to each other by a sealant having a liquid crystal injection inlet for forming a predetermined space between the substrates. Liquid crystals are injected through the inlet between the first and second substrates.

One method of injecting the liquid crystals includes the steps of maintaining a vacuum state between the two substrates bonded to each other through the sealant and dipping the liquid crystal injection inlet in the liquid crystals so that injection between the two substrates takes place by capillary action. Once the liquid crystals are injected, the liquid crystal injection inlet is sealed using a sealing agent.

In another method of fabricating a liquid crystal display a 'liquid crystal dropping' process is carried out where the substrates are bonded to each other after a proper amount of liquid crystals have been dropped on the first or second substrate.

Conventionally, a thin film transistor array having the gate line, data line, pixel electrode, and thin film transistor formed on the first substrate (TFT array substrate) is fabricated using 5~8 masks. More recently, a new fabrication technique using four masks has been developed. In the new fabrication method, a 4-mask process, is used in the four mask process, a separate mask is used for a gate line forming process, a process of forming a data line having source/drain electrodes and an active layer, a process of forming a contact hole in a passivation layer, and a process of forming a pixel electrode, respectively.

In the 4 mask process, molybdenum (Mo) is used to form the data line instead of chromium (Cr) in the process of forming the data line and active layer. In this process, however, the etch rate variation of Mo is greater than that of Cr.

A method for fabricating a thin film transistor array in a liquid crystal display using four masks according to the prior art will now be explained by referring to FIGS. 1 and 2 of the drawings.

FIG. 1 illustrates a layout of a liquid crystal display using four masks according to a prior art process. FIGS. 2A to 2G illustrate cross-sectional views of a process along cutting lines I–I', II–II', and III–III' at various stages of the prior art process.

Referring to FIG. 1, a liquid crystal display by the 4-masks process includes a gate line 101 arranged in one direction and a data line 105*d* arranged in a direction perpendicular to the gate line 101. A pixel area is defined by the gate line 101 and the data line 105*d*. As will subsequently be described, a semiconductor layer 103 and a metal layer are stacked on the gate line 101.

A pixel electrode 107*a* is formed in the pixel area, and a thin film transistor is formed at an intersection between the gate line 101 and data line 105*d*. A contact hole 109*a* is formed at a drain electrode of the thin film transistor in order to connect the drain electrode to the pixel electrode 107*a*.

Other contact holes 109*b* and 109*c* are formed on areas of a pad 101*b* of the gate line 101 and a pad 105*c* of the data line 105*d* just to have pad electrodes 110 formed thereon with the same material of the pixel electrode 107*a*, respectively.

Referring to FIG. 2A, after a substrate 100 has been cleaned, a gate metal is deposited on the substrate 100 by sputtering. A first photoresist layer is coated on the gate metal, and then exposure and development to form a first photoresist pattern P/R1. Then, the gate metal is selectively removed using the first photoresist pattern as a mask to form a gate line 101 and a gate pad 101*b*. The photoresist pattern P/R1 is then stripped.

Referring to FIG. 2B, a gate insulating layer 102, a semiconductor layer 103, an ohmic contact layer 104, and a data metal layer 105 having low resistance are sequentially formed on an entire surface of the substrate including the gate line and pad 101 and 101*b*. A second photoresist layer is then coated on the data metal layer 105. In this case, the data metal layer 105 having the low resistance is formed of Mo.

Referring to FIG. 2C, a second photoresist pattern P/R2 for a data line pattern is formed by exposure and development using a second mask (half-tone mask). In this case, the second mask (half-tone mask) is formed to cut off light corresponding to the data line completely as well as transmit the light of a predetermined quantity to a portion corresponding to a channel area of a thin film transistor. Hence, the developed second photoresist pattern maintains its originally-deposited thickness on a data line forming area but is formed relatively thin on the channel area of the thin film transistor.

Subsequently, the low-resistance data metal layer 105, ohmic contact layer 104, and semiconductor layer 103 except portions in the data line (including pad) and thin film transistor forming areas, are removed by wet or dry etching using the second photoresist pattern P/R2 as a mask.

Referring to FIG. 2D, ashing is carried out on the second photoresist pattern P/R2 in order to remove a portion of the second photoresist pattern corresponding to the channel area of the thin film transistor. In this case, an overall thickness of the second photoresist pattern is decreased as well as a width thereof. Hence, widths of the data line and the source/drain electrodes that will be formed later will be varied.

Referring to FIG. 2E, the low resistance data metal layer 105 and ohmic contact layer 104 corresponding to the channel area of the thin film transistor are etched using the ashed second photoresist pattern P/R2. The etching process forms a data line 105d including a final pad and a thin film transistor including source and drain electrodes 105a and 105b. The second photoresist pattern P/R2 is then stripped.

Referring to FIG. 2F, a passivation layer 106 is deposited over an entire surface of the substrate including the source and drain electrodes 105a and 105b. Then, a third photoresist P/R3 is coated on the passivation layer 106. The photoresits is exposed and developed to form a third photoresist pattern P/R3 exposing a portion of the drain electrode 105b and the gate and data pads 101b and 105c. The passivation layer 106 is then selectively etched using the third photoresist pattern as a mask to form contact holes 109a, 109b, and 109c on the drain electrode 105b, gate pad 101b, and data pad 105c, respectively. Then, the third photoresist pattern P/R3 is stripped.

Referring to FIG. 2G, a transparent electrode (ITO) 107 is deposited on an entire surface and connected to the drain electrode 105b, gate pad 101b, and data pad 105c through the contact holes 109a, 109b, and 109c and fourth photoresist P/R4 is coated on the transparent electrode 107. Then the photoresist is exposed and developed to form a fourth photoresist pattern P/R4 for patterning a pixel electrode and each pad electrode.

A pixel electrode 107a is formed by removing a portion of the transparent electrode selectively using the fourth photoresist pattern as a mask, and simultaneously pad electrodes 110 are formed on the pads. The fourth photoresist pattern is then stripped.

The prior art liquid crystal display and fabricating method art have the following disadvantages or problems. First, when the liquid crystal display is fabricated using the four masks, when the data metal layer and semiconductor layer are initially patterned, ashing is carried out on the photoresist. Then, the data line metal is etched again to form the final data line. Hence, if Mo is used for the data line metal, the MO etch rate varies at each location. Thus, it is difficult to provide a data line having a precise pattern. Secondly, since it is difficult to provide a precisely patterned data line, the specific resistance of the data line varies. A resistance variation in the data lines increases the possibility of failure of the liquid crystal display.

SUMMARY OF THE INVENTION

The present invention is directed to a liquid crystal display device and a fabricating method that substantially addresses one or more problems associated with the limitations and disadvantages of the prior art.

An object of the present invention is to provide a liquid crystal display device and a fabricating method in which the process is optimized by forming metal samples for data line patterns having various widths respectively on a circumference of a cell just to measure a specific resistance of data lines formed by an ashing process. Additionally, the measured specific resistance provides information for improving the design of the device.

Additional advantages, objects, and features of the invention will be set forth in the description which follows and will become apparent to those of ordinary skill in the art.

To achieve these objects and advantages in accordance with the invention, as embodied and broadly described herein, a liquid crystal display device according to the present invention includes a substrate divided into active and dummy areas. Gate and data lines are formed in the active area in directions perpendicular to each other and a plurality of metal samples are formed in the dummy area.

Preferably, the line width of the metal samples differ from each other.

More preferably, the line widths of the metal samples differ by about 1 µm to about 12 µm.

Preferably, the metal samples are formed of the same material as the data lines.

Preferably, the data lines and the metal samples are formed by a stacked semiconductor layer and metal layer.

More preferably, the data line and metal samples are formed of a material including Mo.

In another aspect of the present invention, a liquid crystal display device includes a substrate divided into active and dummy areas. A gate line besides on the substrate in the active area, and includes a pad. A gate insulating layer overlies the entire surface of the substrate including the gate line. A data line besides on the gate insulating layer in the active area in a direction substantially perpendicular to the gate line. A plurality of metal samples reside on the gate insulating layer in the dummy area and a passivation layer overlies the entire surface of the data line and respective metal samples. A transparent electrode overlies the passivation layer in a pixel area as well as the pads of the gate line, data line, and metal sample.

Preferably, a plurality of the metal samples differ in widths in order to monitor the etch rate when forming the data line and source/drain electrodes.

More preferably, a plurality of the metal samples differ in widths by about 1 µm to about 12 µm.

Preferably, the metal samples are formed with the same material of the data line.

Preferably, the data line and metal samples are formed by a stacked semiconductor layer and metal layer.

More preferably, the data line and metal samples are formed of a material including Mo.

In a further aspect of the present invention, a method of fabricating a liquid crystal display device includes forming a gate line on a substrate to create a gate electrode and forming a gate insulating layer on an entire surface on the substrate. A data line having source/drain electrodes on the gate insulating layer is formed in an active area of the substrate and a plurality of metal samples are simultaneously formed on the gate insulating layer in a dummy area of the substrate. A passivation layer is formed on an entire surface including the data line and metal samples, and a contact hole is formed on the drain electrode and a pixel electrode is formed in a pixel area over the passivation layer.

Preferably, a plurality of the metal samples are formed having line widths that differ from each other.

More preferably, a plurality of the metal samples are formed to have line widths that differ by about 1 μm to about 12 μm.

Preferably, the method includes sequentially forming a semiconductor layer and a metal layer on the gate insulating layer. The metal and semiconductor layers are patterned such that portions thereof remain on areas where the data line, a thin film transistor, and the metal samples are formed. Then, the metal layer is patterned to form a portion thereof corresponding to a channel area of the thin film transistor.

More preferably, the semiconductor layer includes an active layer and an ohmic contact layer and the ohmic contact layer is patterned together with the metal layer.

More preferably, the metal layer includes a metal of Mo.

More preferably, an etch rate when patterning the metal layer is monitored by measuring a thickness of the metal sample.

More preferably, an etch rate when patterning the metal layer is monitored by measuring a specific resistance of the metal sample.

Preferably, the gate line and data line and metal samples include contact pads, wherein contact holes are formed at the contact pads of gate line and data line and metal samples and pad electrodes are formed on the pads with the same material as the pixel electrode.

It is to be understood that both the foregoing general description and the following detailed description of the present invention are exemplary and explanatory and are intended to provide further explanation of the invention as claimed.

BRIEF DESCRIPTION OF THE DRAWINGS

FIGS. 2A to 2G illustrate cross-sectional views of a process along cutting lines I–I', II–II', and III–III' in FIG. 1 according to the prior art;

FIGS. 6A to 6G illustrate cross-sectional views of an active area at various stages of processing according to the present invention taken along reference lines IV–IV', V–V', and VI–VI' of FIG. 5.

DETAILED DESCRIPTION OF THE INVENTION

Reference will now be made in detail to the preferred embodiments of the present invention, examples of which are illustrated in the accompanying drawings. Wherever possible, the same reference numbers are used throughout the drawings to refer to the same or like parts.

Figure 1:
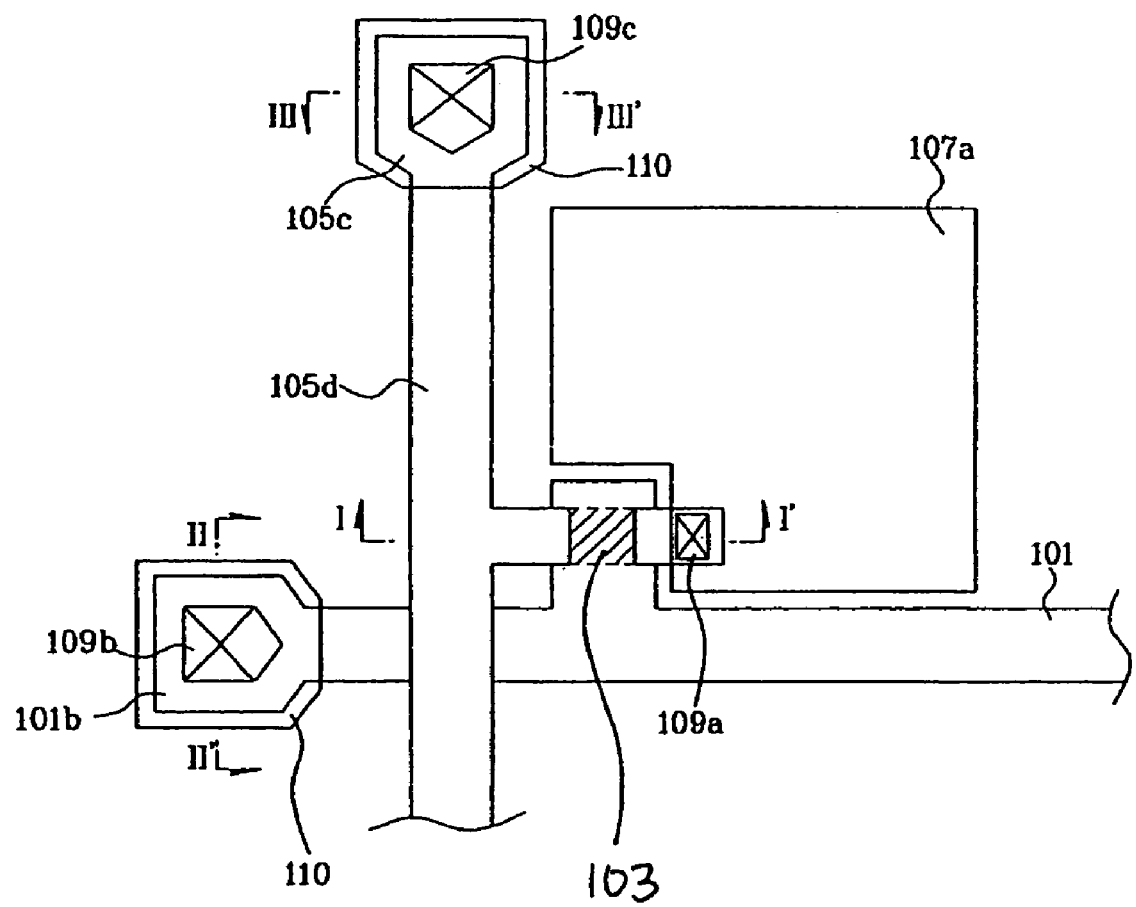
FIG. 1 illustrates a layout of a liquid crystal display using four masks according to the prior art.
Figure 2B:
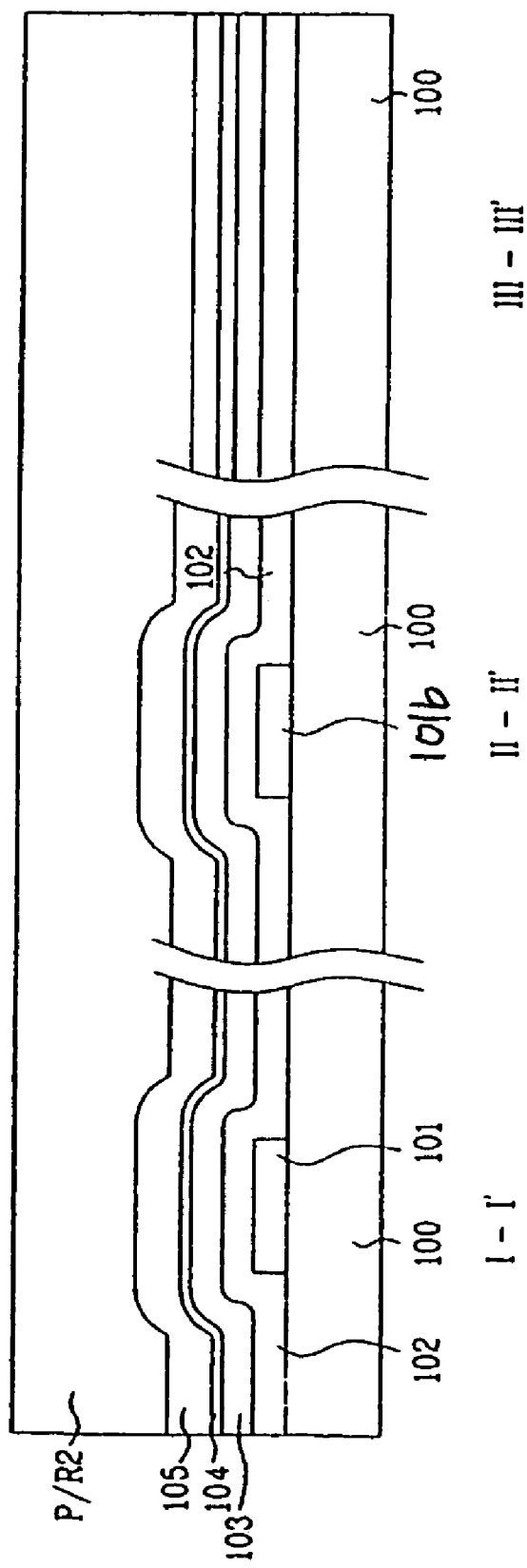
Figure 2C:
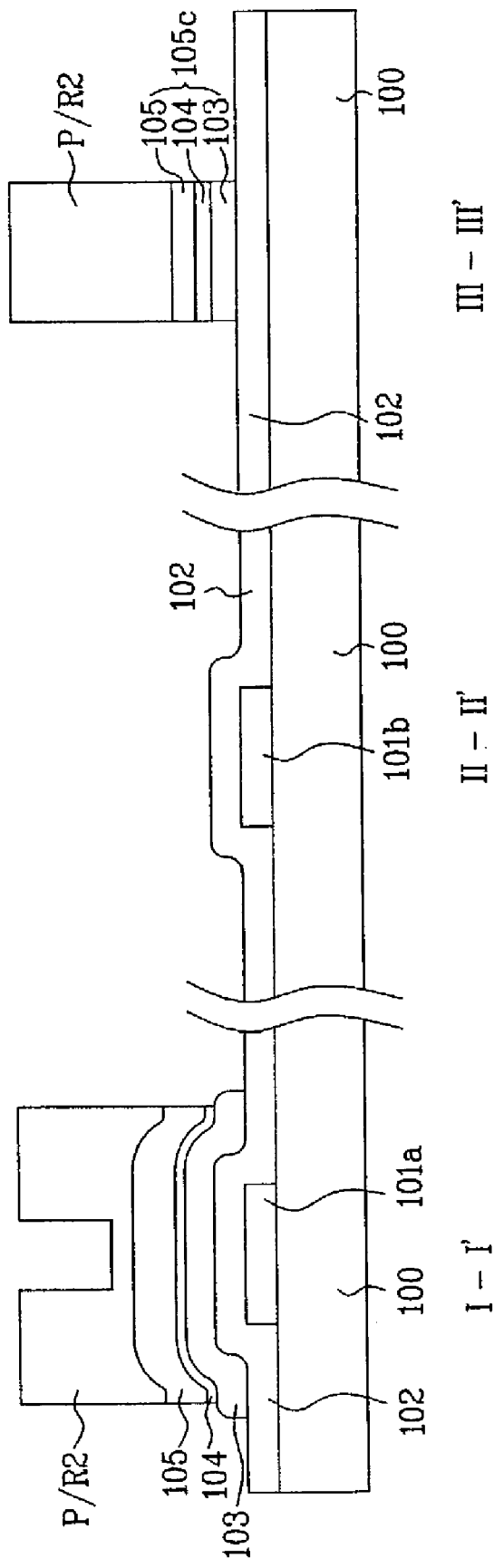
Figure 2D:
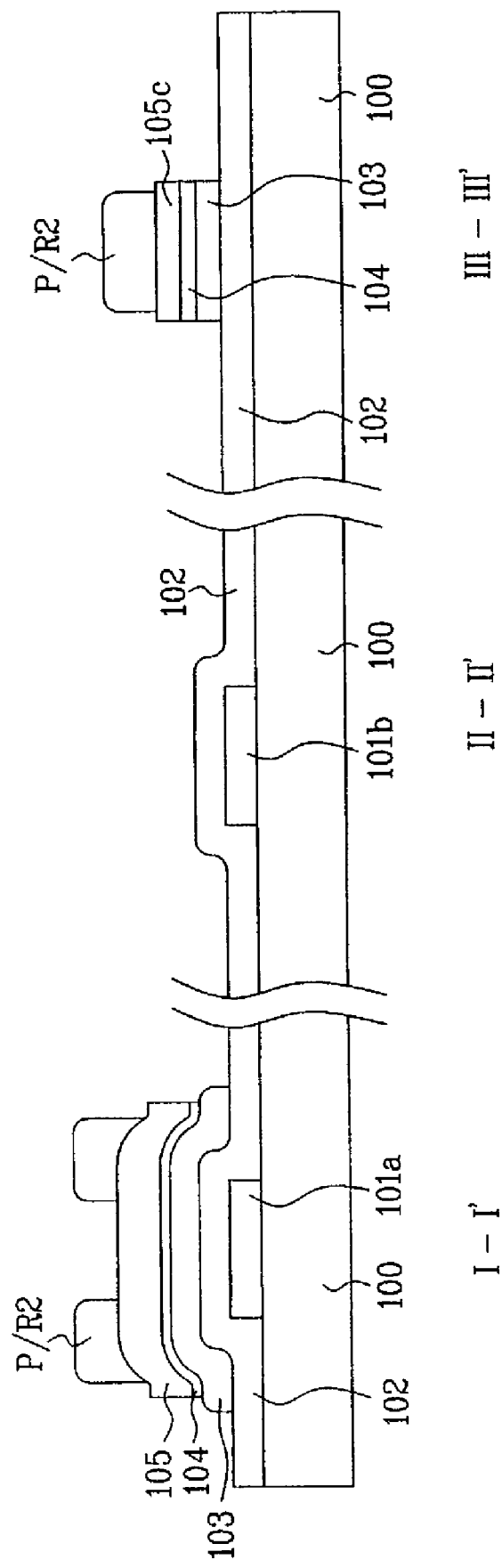
Figure 2F:
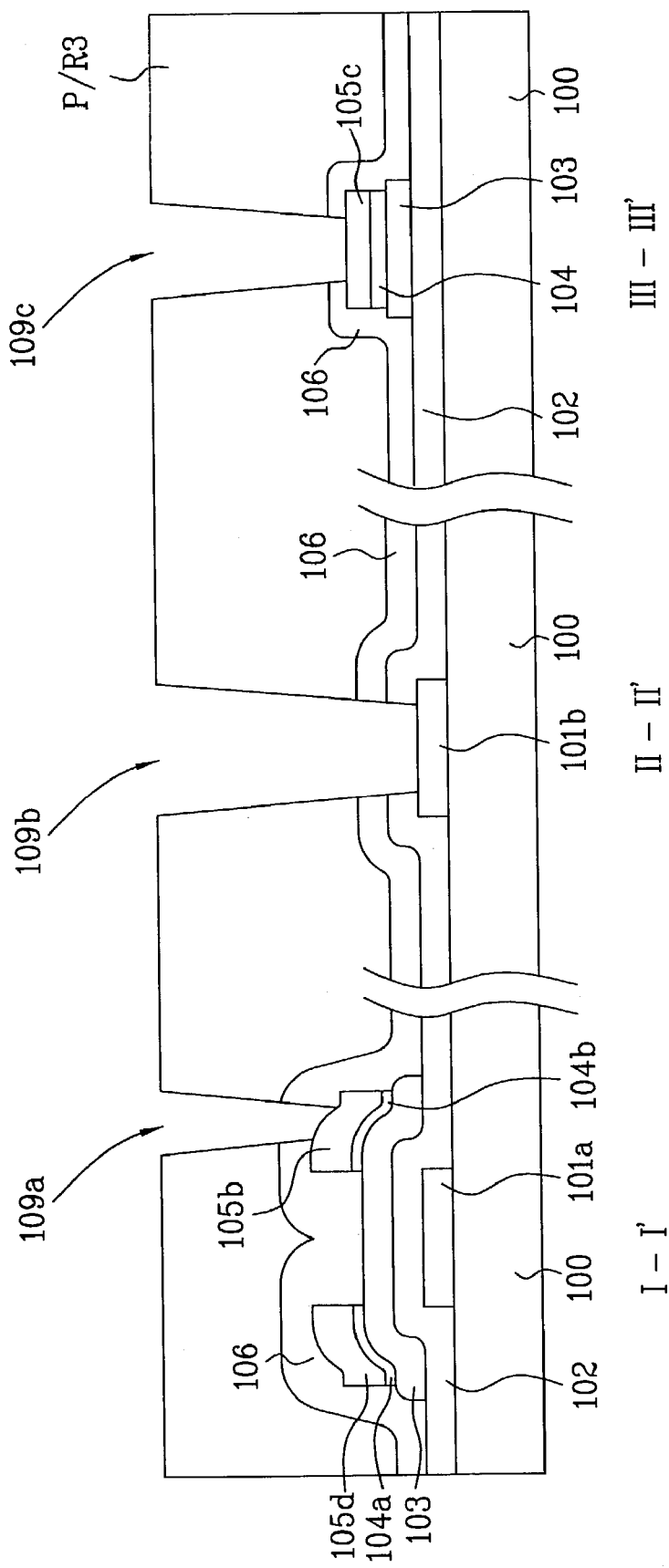
Figure 2G:
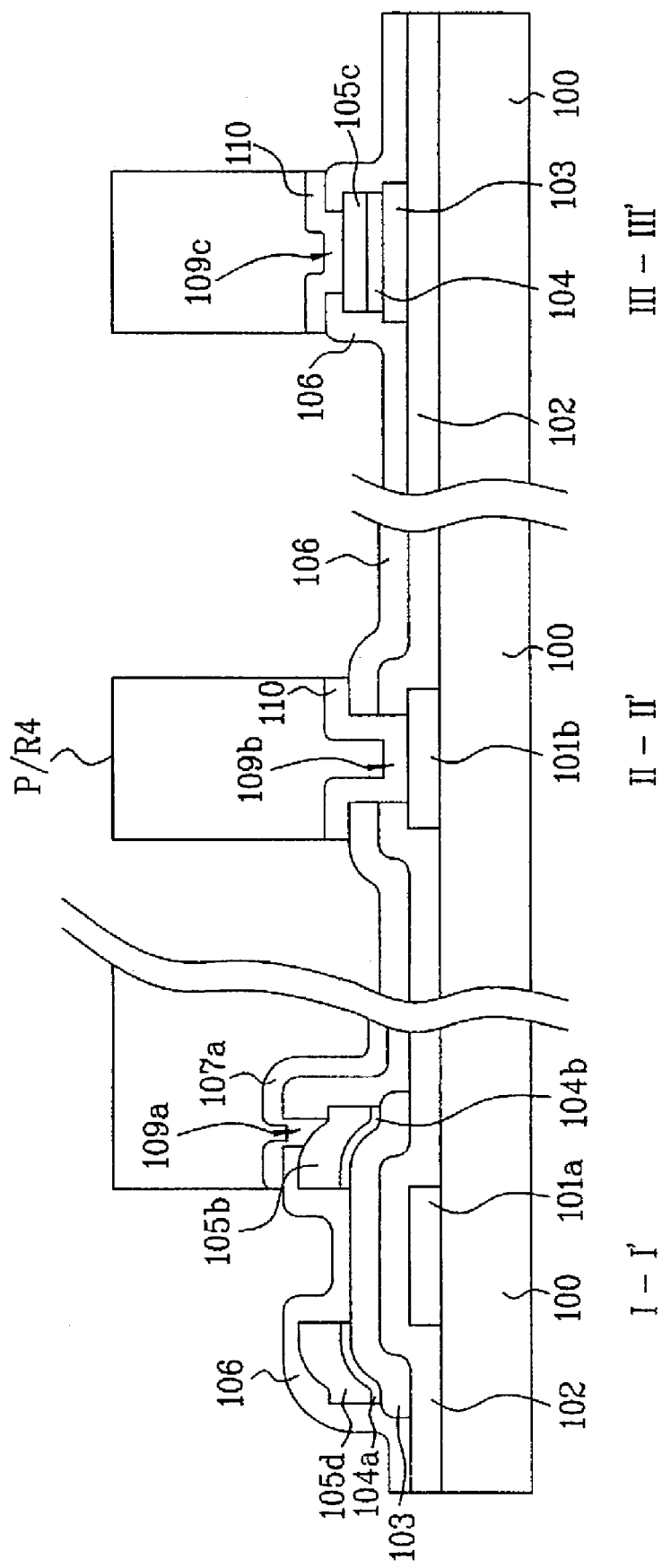
Figure 3:
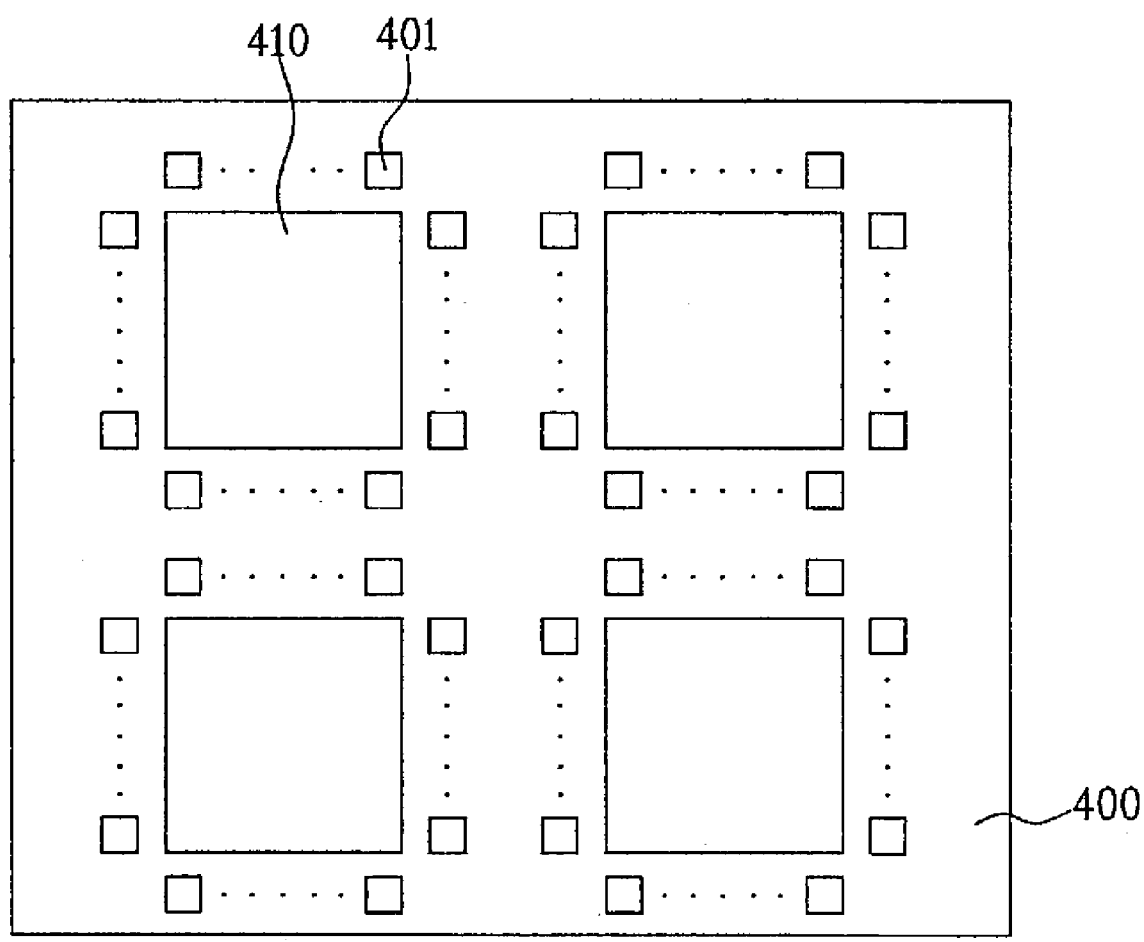
FIG. 3 illustrates a layout in accordance with the invention of metal samples for measuring an ashing rate arranged on a dummy area.
Figure 4:
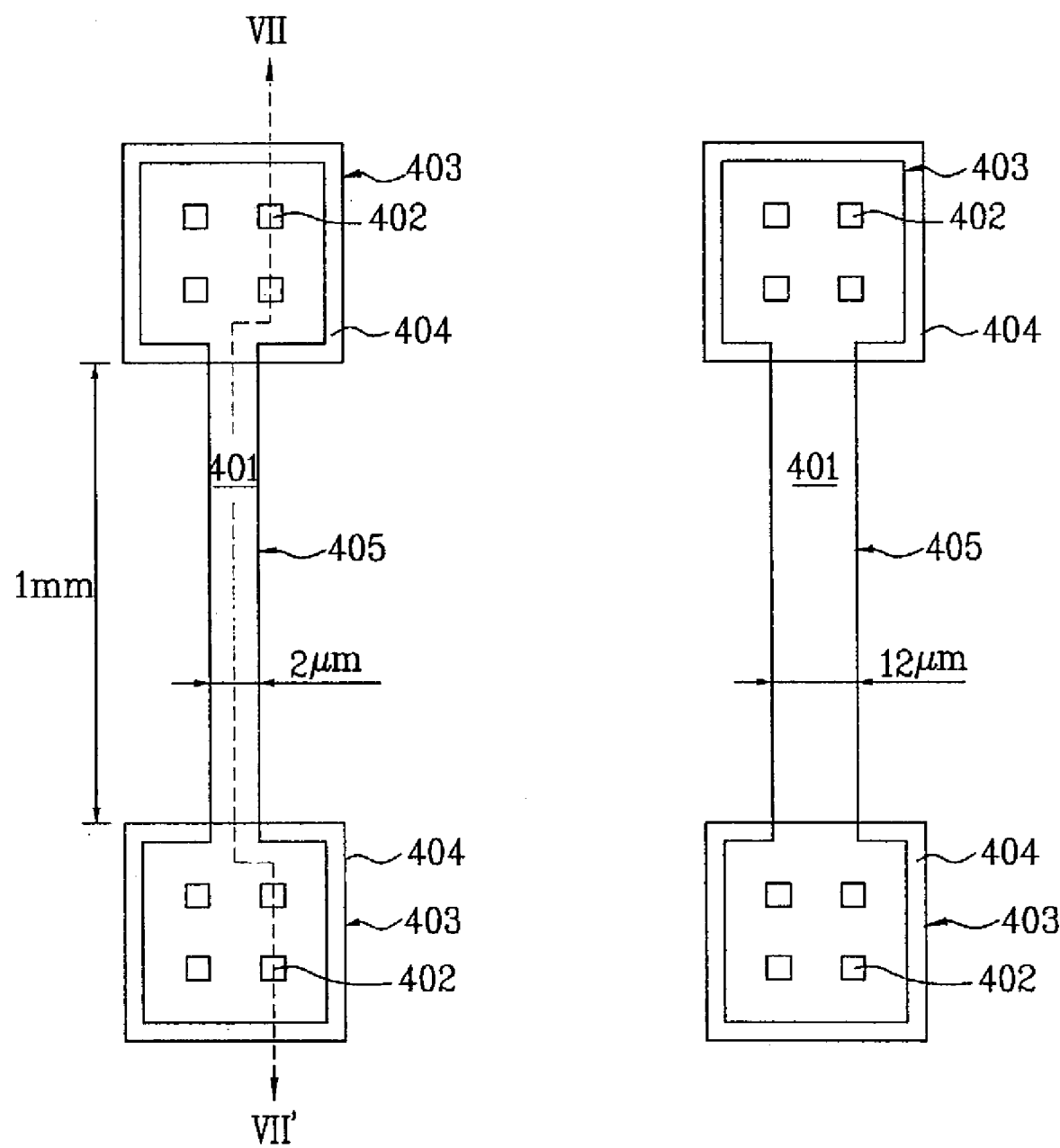
FIG. 4 illustrates a magnified view of metal samples according to the present invention.

FIG. 3 illustrates a layout of metal samples for measuring an ashing rate arranged on a dummy area and FIG. 4 illustrates a magnified view of the metal samples according to the present invention.

In contrast to the prior art, a liquid crystal display, in accordance with the invention, includes a plurality of panels on a single substrate. A plurality of panels are simultaneously formed and then the mother substrate is cut into respective panels for a plurality of unit panels. Hence, a portion where each panel is formed is designated as an active area and a circumferential area of each of the active areas is referred to as a dummy area.

Referring to FIG. 3, a liquid crystal display device according to the present invention includes a plurality of active areas 410 arranged on a mother substrate 400. A plurality of metal samples 401 are arranged on a dummy area around each of the active areas 410.

Each of the metal samples 401, illustrated in FIG. 4, includes an electrode portion 405 and pad portions 403 formed at both ends of the electrode portion 405. As noted, the width of the electrode portions 405 differ from each other. Each of the electrode portions 405 have substantially the same length. In the illustrated embodiment, the electrode portions have a length of about 1 mm. Consequently, the widths of the electrode portions 405 differ from each other by at least about 1 μm. In accordance with the invention, the width difference can vary over a range of about 2 μm to about 12 μm. Each of the pad portions 403 has a pad electrode 404 formed thereon with a transparent conductive layer having the same shape as the pad, gate, or data line that will be formed in the active area 410.

In accordance with the invention, a plurality of the metal samples 401 having differing widths are formed simultaneously under the same processing conditions as that used to form the active areas 410. After fabrication, the width and specific resistance of each metal sample 401 is measured and the data is used to design the device.

A liquid crystal display device having metal samples formed in the active areas according to the present invention will now be described.

Figure 5:
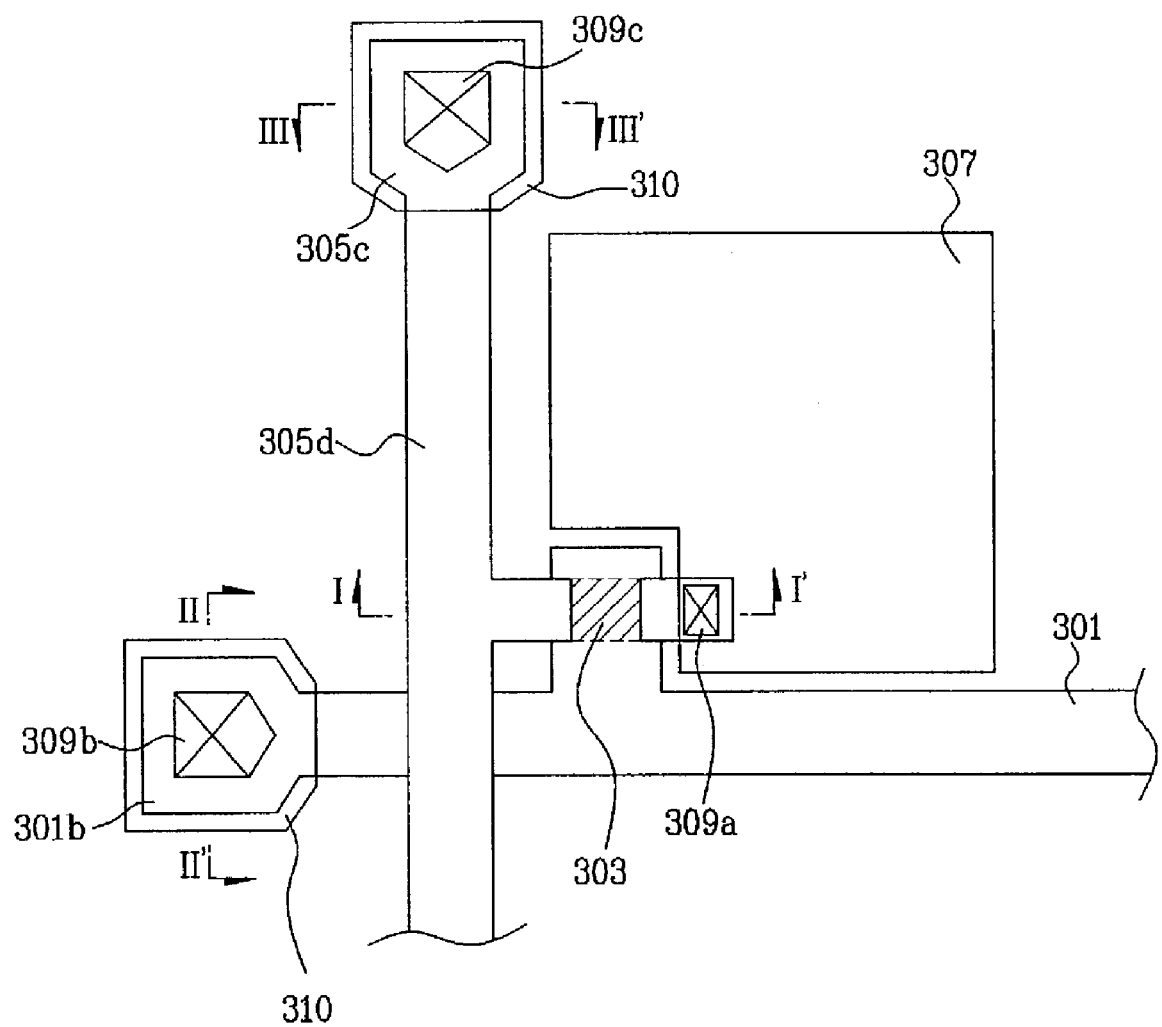
FIG. 5 illustrates a layout of a unit cell of a liquid crystal display device formed in an active area according to the present invention.

Referring to FIG. 5, a liquid crystal display device fabricated by a 4 masks process according to the present invention includes a gate line 301 arranged in one direction and a data line 305d arranged in a direction perpendicular to the gate line 301. A semiconductor layer 303 and a metal layer are stacked to form source/drain electrodes 305a and 305b. A pixel area is defined by the gate lines 301 and the data lines 305d.

A pixel electrode 307a (shown in FIG. 6G) is formed in the pixel area, and a thin film transistor is formed at an intersection between the gate 301 and the data line 305d. A contact hole 309a is formed at the drain electrode 305b (shown in FIGS. 6E and 6G) of the thin film transistor in order to connect the drain electrode 305b to the pixel electrode 307a electrically.

A method of fabricating the above-constituted liquid crystal display device using the four masks according to the present invention will now be described.

Figure 6D:
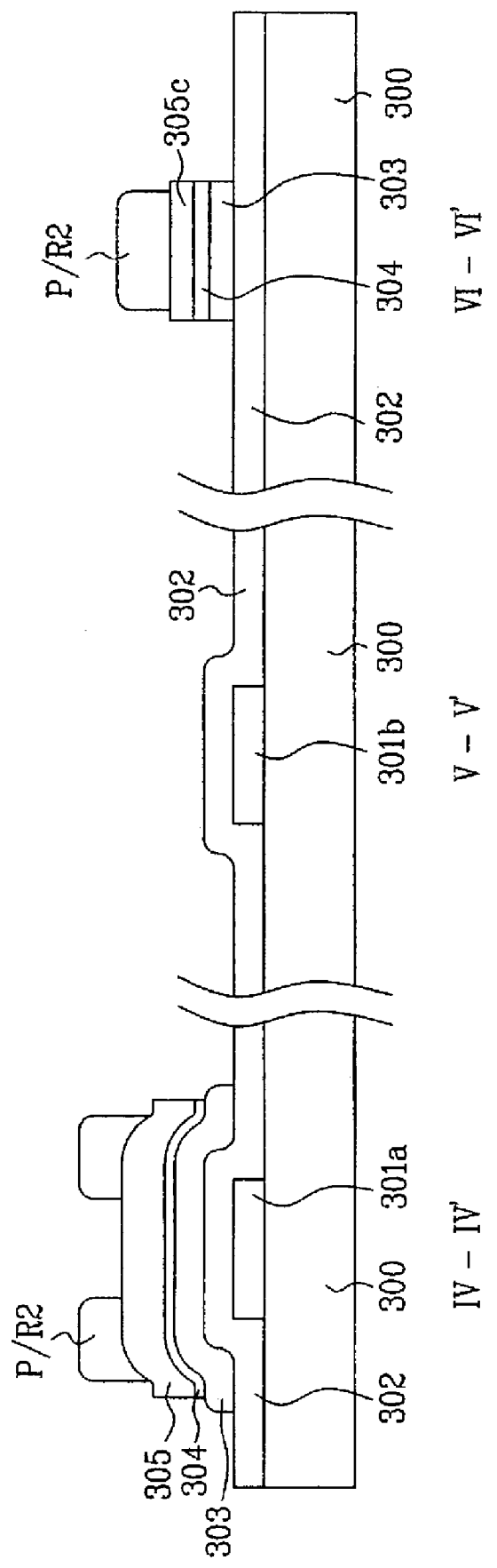
Figure 7A:
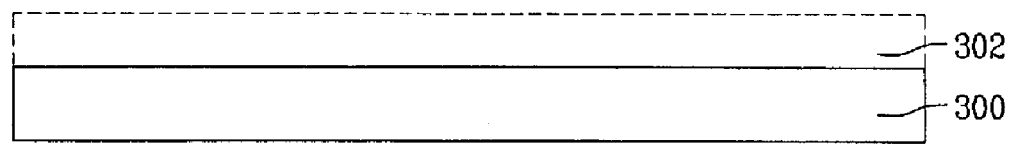
FIGS. 7A to 7G illustrate cross-sectional views of a process for forming metal samples in a dummy area according to the present invention.

Referring to FIG. 6A and FIG. 7A, after a substrate 300 has been cleaned, a gate metal (shown in silhouette) is deposited on the substrate 300 by sputtering. A first photoresist layer is coated on the gate metal and exposed and developed to form a first photoresist pattern P/R1 for forming a gate line. The gate metal is selectively removed using the first photoresist pattern to form a gate line 301 having a gate electrode 301a and a gate pad 301b in an active area. The photoresist pattern P/R1 is then stripped.

Figure 7B:
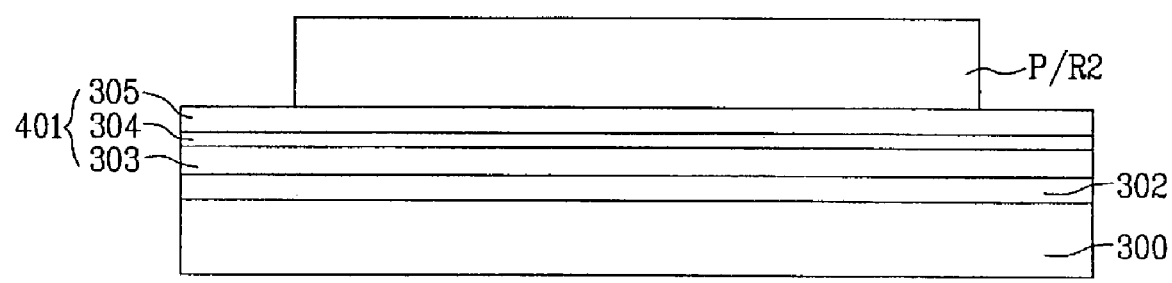

Referring to FIG. 6B and FIG. 7B, a gate insulating layer 302, a semiconductor layer 303, an ohmic contact layer 304, and a low-resistance data metal layer 305 are sequentially formed over the entire surface of the active and dummy areas having the gate line 301 and pad 301b formed thereon. A second photoresist P/R2 is then coated on the data metal layer 305. In this case, the low-resistance data metal layer 305 is formed of Mo.

Figure 7C:
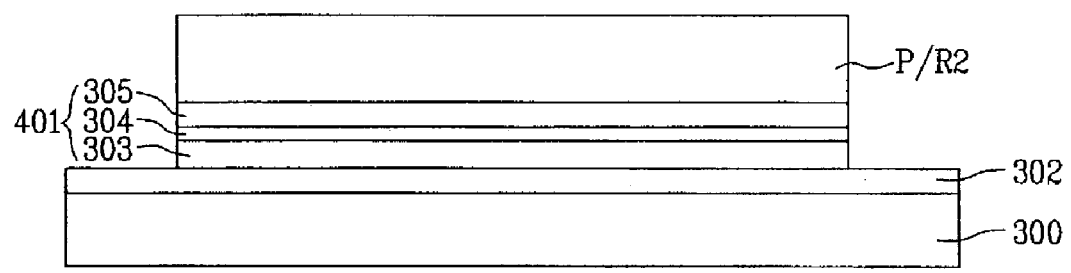

Referring to FIG. 6C and FIG. 7C, a second photoresist pattern P/R2 for a data line pattern and a second photoresist pattern P/R2 for a metal sample pattern are formed in the active and dummy areas, respectively, by exposure and development using a second mask (half-tone mask). In this case, the second mask (half-tone mask) is formed to cut off light corresponding to the data line completely as well as transmit the light of a predetermined quantity to a portion corresponding to a channel area of a thin film transistor. Hence, the developed second photoresist pattern maintains its originally-deposited thickness on the data line and metal sample forming areas, but is formed relatively thin on the channel area of the thin film transistor.

Subsequently, the low-resistance data metal layer 305, ohmic contact layer 304, and semiconductor layer 303 (except portions in the data line (including pad), thin film transistor, and metal sample forming areas) are removed by wet or dry etch using the second photoresist pattern P/R2 as a mask. In this case, the metal sample 401, as illustrated in FIG. 4, are formed to have differing line widths.

Figure 7D:
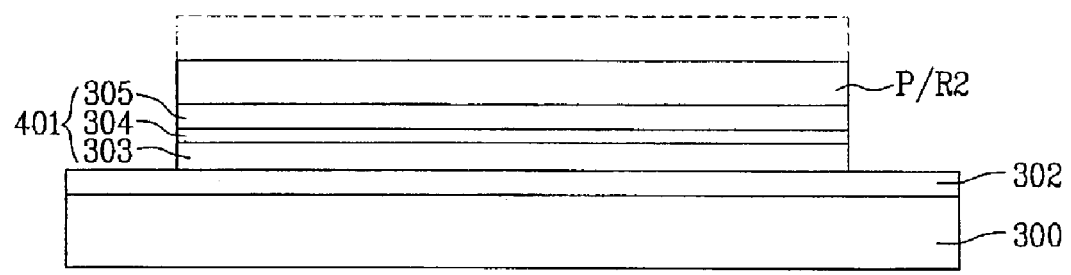

Referring to FIG. 6D and FIG. 7D, an ashing process is carried out on the second photoresist pattern P/R2 just to remove a portion of the second photoresist pattern corresponding to the channel area of the thin film transistor. In this case, the overall thickness of the second photoresist pattern is decreased as well as a width thereof. Hence, the widths of data line and source/drain electrodes that will be formed later will be reduced.

Figure 7E:
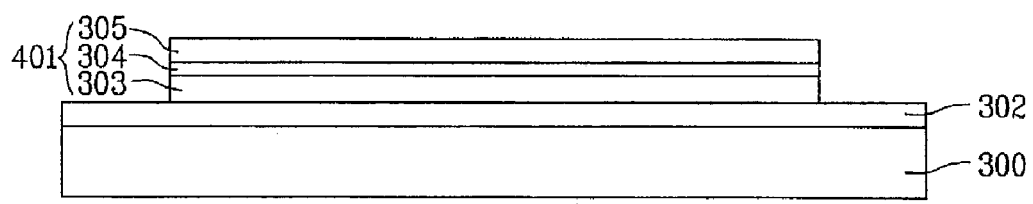

Referring to FIGS. 6E and 7E, the low resistance data metal layer 305 and ohmic contact layer 304 corresponding to the channel area of the thin film transistor are etched using the ashed second photoresist pattern P/R2. The etching process forms a data line 305d including a data pad 305c in the active area, a thin film transistor including source and drain electrodes 305a and 305b in the active area, and a metal sample in the dummy area. The second photoresist pattern P/R2 is then stripped. In the embodiment illustrated in FIG. 6E, the reference numeral '304a' refers to the patterned ohmic contact layer.

Figure 7F:
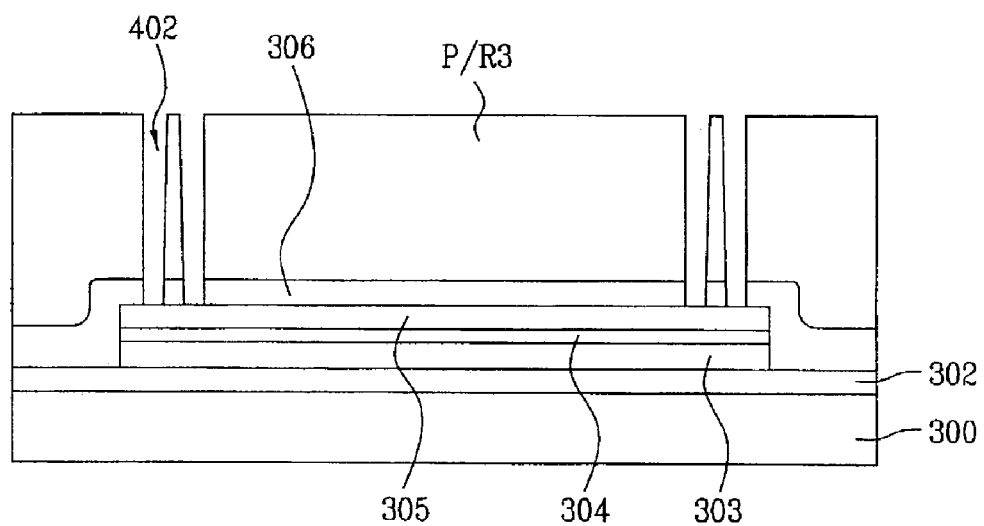

Referring to FIG. 6F and FIG. 7F, a passivation layer 306 is deposited over an entire surface of the substrate including the source electrodes 305a, data line 305d having the drain electrode 305b and data pad 305c, and metal sample 401. A third photoresist layer is then coated on the passivation layer 306 and exposure and development are carried out using a third mask just to form a third photoresist pattern P/R3. The third photoresist pattern P/R3 exposes a portion of the drain electrode 305b, the gate pad 301b, and the data pad 305c in the active area and a predetermined portion of a pad area 403 of the metal sample 401 in the dummy area. The passivation layer 306 is then selectively etched using the third photoresist pattern as a mask to form contact holes 309a, 309b, and 309c on the drain electrode 305b, gate pad 301b, and data pad 305c in the active area, respectively. As illustrated in FIG. 7E, a contact hole 402 on the pad area 403 of the metal sample 401 in the dummy area is also formed. After completing the etching process, the third photoresist pattern P/R3 is stripped.

Figure 7G:
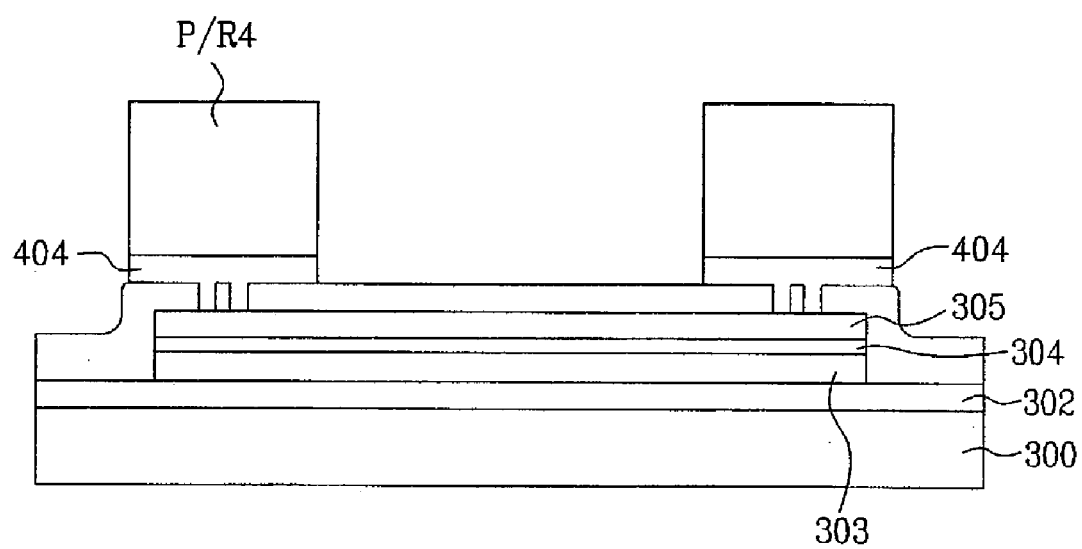

Referring to FIG. 6G and FIG. 7G, a transparent electrode (ITO) 307 is deposited on an entire surface and is connected to the drain electrode 305b, gate pad 301b, and data pad 305c through the contact holes 309a, 309b, and 309c, respectively. The transparent electrode 307 is also formed on the pad of the metal sample 401 through the contact hole 402 (shown in FIG. 7F). A fourth photoresist layer is coated on the transparent electrode 307, and exposed and developed to form a fourth photoresist pattern P/R4 for patterning a pixel electrode and each pad electrode. For purposes of illustration, the fourth photoresist pattern P/R4 is shown only in FIG. 7G.

A pixel electrode 307a is formed in the pixel area by selectively removing a portion of the transparent electrode using the fourth photoresist pattern as a mask, and simultaneously pad electrodes 310 and 404 are formed on the pads, respectively. The fourth photoresist pattern P/R4 is then stripped.

Thus, by the above-explained 4-masks process, a thin film transistor array and a metal sample are formed in the active and dummy areas, respectively. Further, a probe is connected to each pad of the metal samples 401 to measure the resistance of each corresponding metal sample 401.

When the data line is formed to have a width of about 1.5 μm, it is judged that the ashing process has been carried out normally if the metal sample having a width of 3 μm is removed by the ashing process. Hence, the uniformity of the ashing can be known if the metal sample is uniformly removed in each portion.

Accordingly, the liquid crystal display device and fabricating method thereof according to the present invention have the following effects or advantages.

First, when the data line and source/drain electrodes are formed, a width of the source/drain metal which is being etched can be measured using the sample that is formed simultaneously with the source/drain electrodes. Thus, the corresponding thickness can be checked precisely and used in the later design.

Second, when the data line and source/drain electrodes are formed, a specific resistance of the source/drain metal that is being etched can be measured using the sample that is formed simultaneously with the source/drain electrodes. Thus, the corresponding specific resistance can be checked precisely and used in the later design.

It will be apparent to those skilled in the art that various modifications and variations can be made in the present invention. Thus, it is intended that the present invention include those modifications and variations within the scope of the appended claims and their equivalents.

The invention claimed is:

1. A liquid crystal display device comprising:
   a plurality of active areas formed on and across a substrate, the plurality of active areas having a dummy area surrounding an active area;
   gate lines and data lines overlapping the active areas in directions substantially perpendicular to each other wherein the gate lines and the data lines are not disposed in the dummy area; and
   a plurality of metal samples formed in the dummy area wherein the plurality of metal samples are not disposed between the gate lines and between the data lines,
   wherein a thickness or resistance of at least one of the plurality of metal samples is adapted to permit monitoring of an etch rate.

2. The liquid crystal display device of claim 1, wherein at least a portion of the plurality of metal samples differ from each other in line width.

3. The liquid crystal display device of claim 2, wherein the line width of metal samples differs by about 1 µm to about 12 µm.

4. The liquid crystal display device of claim 1, wherein the plurality of metal samples comprise the same material as the data line.

5. The liquid crystal display device of claim 1, wherein the data lines and the plurality of metal samples comprise a stacked semiconductor layer and a metal layer.

6. The liquid crystal display device of claim 5, wherein the data lines and the plurality of metal samples comprise a material including Mo.

7. A liquid crystal display device comprising:
a plurality of active areas formed on and across a substrate, the plurality of active areas having a dummy area surrounding an active area;
a gate line formed on the substrate in the active area and including a gate line contact pad;
a gate insulating layer overlapping the substrate and the gate line;
a data line overlapping the gate insulating layer in the active area in a direction perpendicular to the gate line, the data line including a data line contact pad;
a plurality of metal samples formed on the gate insulating layer in the dummy area, the metal samples including contact pads wherein the plurality of metal samples do not electrically contact the gate line and the data line;
a passivation layer formed over the data line and the plurality of metal samples;
a transparent electrode overlying the passivation layer in a pixel area and the contact pads of the gate line, the data line, and the plurality of metal samples; and
source/drain electrodes fromed in the active area,
wherein at least a portion of the plurality of the metal samples have different line width, so as to permit monitoring of an etch rate when forming the date line and the source/drain electrodes,
wherein the gate line and the data line are not disposed in the dummy area.

8. The liquid crystal display device of claim 7, wherein the line width of the metal samples differs by about 1 µm to about 12 µm.

9. The liquid crystal display device of claim 7, wherein the plurality of metal samples comprise the same material as the data line.

10. The liquid crystal display device of claim 7, wherein the data line and the plurality of metal samples comprise a stacked semiconductor layer and a metal layer.

11. The liquid crystal display device of claim 10, wherein the data line and the plurality of metal samples comprise a material including Mo.

12. A method of fabricating a liquid crystal display device, comprising:
forming gate lines on a substrate to have a gate electrode;
forming a gate insulating layer overlying the substrate;
forming data lines having source and drain electrodes on the gate insulating layer in an active area of the substrate and simultaneously forming a plurality of metal samples on the gate insulating layer in a dummy area of the substrate wherein the plurality of metal samples do not electrically contact the gate lines and the data lines and are not disposed between the gate lines and between the data lines;
forming a passivation layer overlying the substrate and the data line and the plurality of metal samples;
forming a contact hole on the drain electrode and forming a pixel electrode overlying the passivation layer in a pixel area of the substrate; and
monitoring an etch rate by measuring at least one of a thickness or resistance of at least one of the plurality of metal samples.

13. The method of claim 12, wherein at least a portion of the plurality of the metal samples are formed to have line widths that differ from each other.

14. The method of claim 13, wherein the line widths of the metal samples differ by about 1 µm to about 12 µm.

15. The method of claim 12, wherein forming a data line comprises:
sequentially forming a semiconductor layer and a metal layer on the gate insulating layer;
patterning the metal and semiconductor layers to form portions thereof on the data line, a thin film transistor, and the metal samples; and
patterning the metal layer to form the channel area of the thin film transistor.

16. The method of claim 15, wherein the semiconductor layer comprises an active layer and an ohmic contact layer, and wherein the ohmic contact layer is simultaneously patterned together with the metal layer.

17. The method of claim 15, wherein the metal layer comprises a metal including Mo.

18. The method of claim 15, wherein an etch rate when patterning the metal layer is monitored by measuring a thickness of at least one of the plurality of metal samples.

19. The method of claim 15, wherein an etch rate when patterning the metal layer is monitored by measuring a specific resistance of at least one of the plurality of metal samples.

20. The method of claim 12, wherein the gate lines and data line and each of the plurality of metal samples include contact pads, and wherein contact holes are formed at a respective contact pad of the gate line and the data line and the plurality of metal samples, and wherein the method further comprises forming pad electrodes on the contact pads with substantially the same material as the pixel electrode.

* * * * *